Dec. 22, 1925.　　　　　　　　　　　　　　　1,566,712
A. B. W. WENDT
MANICURE AND PEDICURE IMPLEMENT
Filed Aug. 1, 1923
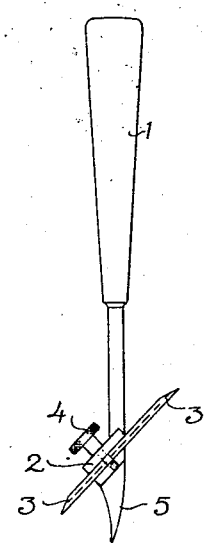
Fig. 1
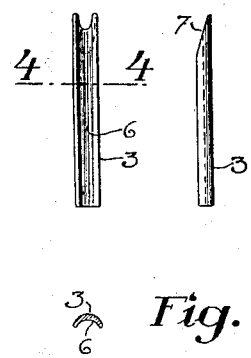
Fig. 2　Fig. 3
Fig. 4
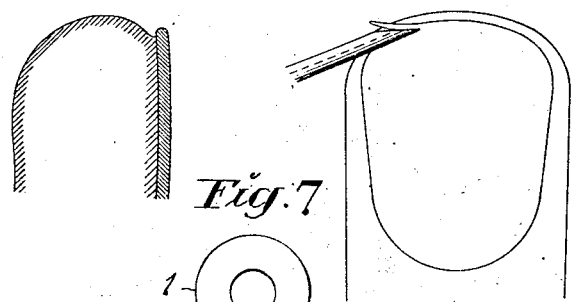
Fig. 5　　　　　　Fig. 6
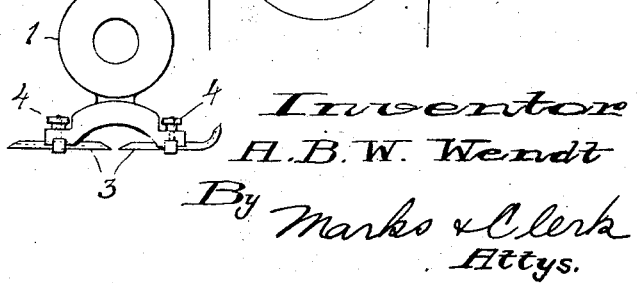
Fig. 7
Inventor
A. B. W. Wendt
By Marks & Clerk
Attys.

Patented Dec. 22, 1925.

1,566,712

UNITED STATES PATENT OFFICE.

ANDERS BRYNOLF WALDEMAR WENDT, OF UMEA, SWEDEN.

MANICURE AND PEDICURE IMPLEMENT.

Application filed August 1, 1923. Serial No. 655,125.

*To all whom it may concern:*

Be it known that ANDERS BRYNOLF WALDEMAR WENDT, a subject of the King of Sweden, residing at Umea, in the Kingdom of Sweden, has invented certain new and useful Improvements in Manicure and Pedicure Implements, of which the following is a specification.

This invention relates to a manicure and pedicure implement comprising a handle and one or more preferably detachable cutting tools. The characteristic feature of the invention consists in the edges of the cutting tools being so shaped, that after the cutting operation the contour of the edge of the nail in cross section is convex or rounded, so that there are no sharp recesses or projections, any subsequent trimming of the nail being thus rendered superfluous or at least considerably facilitated.

A form of the invention is shown as an example in the accompanying drawing. Fig. 1 is a side view of the implement. Figs. 2 and 3 show a cutting tool viewed from two different sides. Fig. 4 is a section on the line 4—4 of Fig. 2. Fig. 5 is a section on an enlarged scale of a finger, the nail of which has been cut by means of an implement arranged in accordance with this invention. Fig. 6 illustrates the manner in which the cutting operation is effected. Fig. 7 shows a form with two tools.

1 is the handle of the implement, 2 a holder of the cutting tool or tools 3, and 4 a screw or nut by means of which the tools are fixed. Besides, the implement may be provided with a cleansing or trimming tool 5 of known construction. The cutting tools 3 are, preferably, groove shaped, as shown in Figs. 2 and 3. On the rear side of the cutting tool, opposite to the grooved side 6 one or more plane or curve shaped surfaces 7, Fig. 3, have been ground, each having an oblique direction inward toward the groove, so that the edge thus effected, is substantially curve shaped viewed in the longitudinal direction of the groove 6. The shape of the groove may, evidently, be varied and the cutting edge of the tool may constitute a broken line, the main thing is that the shape shown in Fig. 5 is imparted to the edge of the nail by the cutting operation. The cross section of the cutting tool 3, shown in Fig. 4, is substantially sickle shaped, but many other shapes may, evidently, be used.

The cutting tool in question may advantageously be used also as a scraping tool, by preferably a plurality of thin tools being so combined, that they constitute a file.

The end of the cutting tool may, if necessary, be bent into the shape of a hook or the like. The handle may, evidently, be so shaped that it constitutes itself the cutting tool, or the substantially curve shaped cutting edge may be provided on a knife-blade.

The grinding of the tool may easily be effected.

I claim:

A manicure or pedicure implement, comprising a handle and a cutting and scraping tool, said tool consisting of a bar inclined to the axis of the handle and having a longitudinal groove extending along the whole length thereof, said bar being beveled from the grooved side backwards so as to form a cutting and scraping edge of concave shape, substantially as described.

In testimony whereof I have affixed my signature.

ANDERS BRYNOLF WALDEMAR WENDT.